US012801314B2

(12) United States Patent
Kawai

(10) Patent No.: US 12,801,314 B2
(45) Date of Patent: Nov. 17, 2026

(54) STORAGE MEDIUM, INFORMATION PROCESSING METHOD, AND INFORMATION PROCESSING APPARATUS THAT OBTAINS AN IMAGE AT A SET INTERVAL AND GENERATES A VIDEO WITH A FRAME RATE MATCHING THE INTERVAL

(71) Applicant: CANON KABUSHIKI KAISHA, Tokyo (JP)

(72) Inventor: Ryoya Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 18/415,745

(22) Filed: Jan. 18, 2024

(65) Prior Publication Data

US 2024/0281173 A1 Aug. 22, 2024

(30) Foreign Application Priority Data

Feb. 16, 2023 (JP) ................................. 2023-022680

(51) Int. Cl.
*G06F 3/12* (2006.01)
*G06F 3/14* (2006.01)

(52) U.S. Cl.
CPC . *G06F 3/12* (2013.01); *G06F 3/14* (2013.01)

(58) Field of Classification Search
CPC .................................... G06F 3/12; G06F 3/14
See application file for complete search history.

(56) References Cited

U.S. PATENT DOCUMENTS 9,274,894 B1 * 3/2016 Perry .................. G06F 11/0706
2014/0084071 A1 * 3/2014 Einman .................. G06K 1/121 235/492
2015/0131121 A1 * 5/2015 Kang ................. H04N 1/00472 358/1.15
2023/0038036 A1 * 2/2023 Choi ....................... G06F 9/452

FOREIGN PATENT DOCUMENTS

JP 2019197277 A 11/2019

* cited by examiner

*Primary Examiner* — Wissam Rashid
(74) *Attorney, Agent, or Firm* — Venable LLP

(57) ABSTRACT

An object of the present disclosure is to enable an application different from a certain application to be used even while a function of the certain application is being executed. An embodiment of the present invention is an application program causing an information processing apparatus to execute a method comprising: a first obtaining step of obtaining an image concerning a task being executed by the application program; and a generating step of generating contents based on the image obtained in the first obtaining step. In a case where the application program is switched to a background state during the execution of the task, the contents are displayed on a forefront side on a display unit of the information processing apparatus.

16 Claims, 7 Drawing Sheets

101

306 304 305 501 502 303

STORAGE MEDIUM, INFORMATION PROCESSING METHOD, AND INFORMATION PROCESSING APPARATUS THAT OBTAINS AN IMAGE AT A SET INTERVAL AND GENERATES A VIDEO WITH A FRAME RATE MATCHING THE INTERVAL

BACKGROUND

Field

The present disclosure relates to a storage medium, an information processing method, and an information processing apparatus.

Description of the Related Art

In general, an operation in the background state is often subject to an operational constraint. For example, a certain application program (hereinafter referred to as the application) is running in the background state, the application is allowed to continue the processing only within a certain period of time determined by an operating system (OS). For this reason, if the application fails to complete the processing within the certain period of time, the processing may be cancelled by the OS. The operational constraint in the background state is designed to prevent continuous execution of heavy processing that consumes a huge amount of resources of a smartphone such as a battery and a network while a user is unaware of the consumption.

However, if a user closes a graphical user interface (GUI) of a certain application during execution of a function of the certain application, the operation state of the certain application turns into the background state in some cases. In such a case, there arises a problem that, if the certain application fails to complete task processing within a certain period of time determined by the OS, the OS performs task control to cancel the processing by the certain application and cancel the task.

As a technique for solving this problem, Japanese Patent Laid-Open No. 2019-197277 describes a method in which a print application running in a background state requests the OS to activate a GUI display application configured to run on a foreground. After the GUI display application starts running and then obtains a deferred object, the GUI display application is enabled to parse PrintTicket.

SUMMARY

However, in the technique described in Japanese Patent Laid-open No. 2019-197277, if a user closes the GUI of the GUI display application running in the foreground state, the operation state of the GUI display application turns into the background state, which causes a problem that the processing of the print application is cancelled and the print job is deleted. Accordingly, the technique in the related art has not completely solved the problem that a task such as print processing under execution by an application is canceled in the case where the application turns into the background state.

Therefore, in view of the above-mentioned problem, the present disclosure aims to provide a mechanism that enables an application different from a certain application to be used even during execution of a function of the certain application.

An embodiment of the present disclosure is a non-transitory computer readable storage medium storing an application program causing an information processing apparatus to execute a method including: a first obtaining step of obtaining an image concerning a task being executed by the application program; and a generating step of generating a content based on the image obtained in the first obtaining step, in which in a case where the application program is switched to a background state during the execution of the task, the content is displayed on a forefront side on a display unit of the information processing apparatus.

Further features of the present invention will become apparent from the following description of exemplary embodiments with reference to the attached drawings.

DESCRIPTION OF THE EMBODIMENTS

Hereinafter, specific configurations for carrying out the contents of the present disclosure will be described by using the accompanying drawings. The following embodiments are not intended to unnecessarily limit the invention according to claims. In addition, all the combinations of features described in the embodiments are not necessarily essential for the solution of the invention.

First Embodiment

<Configuration of Print System>

Figure 1:
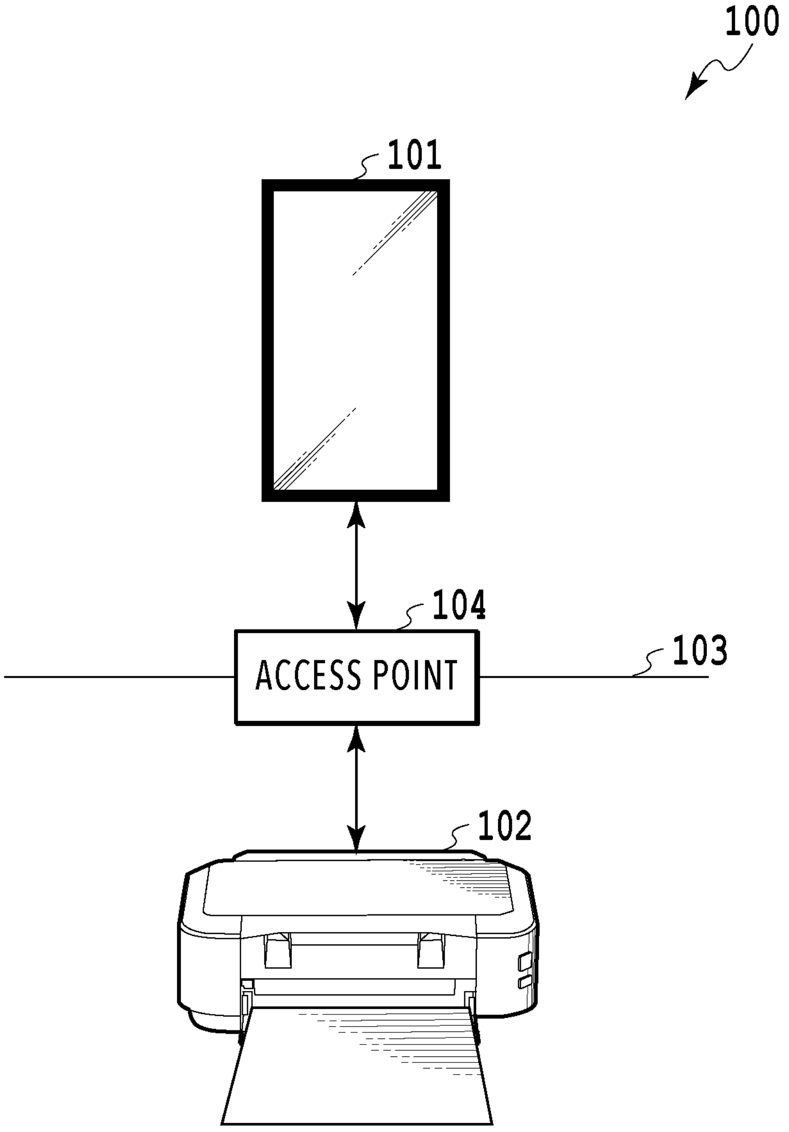
FIG. 1 is a diagram illustrating a print system.

Hereinafter, a configuration of a print system according to a present embodiment will be described by using FIG. 1. FIG. 1 is a diagram illustrating an example of the print system according to the present embodiment. This print system 100 includes a smartphone 101 as one example of an information processing apparatus and a printer 102 as one example of a printing apparatus configured to receive a print job containing print data and perform printing based on the print data. The apparatuses included in the print system 100 are coupled to a network 103 via an access point 104. Thus, the apparatuses are enabled to communicate with each other through the network 103 including Wireless Fidelity (Wi-Fi) (registered trademark).

The printer 102 may be a single-function printer having a print function only or a multi-function printer having a print function, a scan function, and a copy function. In this example, the smartphone 101 is employed as the information processing apparatus. However, the information processing apparatus is not limited to this, and any of various apparatuses such as a tablet, a portable terminal, and a laptop personal computer (PC) may be employed. In addition, the number of smartphones 101 coupled to the network 103 is not limited to one, but may be two or more. The smartphone 101 is capable of transmitting a print job containing print data to the printer 102.

The smartphone 101 and the printer 102 communicate with each other via the external access point 104 in FIG. 1, but may communicate with each other directly (without using the access point 104). Here, the access point 104 is a device constructing the network, and is the device configured to determine a communication channel to be used in communications in the constructed network. In the present embodiment, Wireless Fidelity (Wi-Fi) (registered trademark) is used, but Bluetooth Classic (registered trademark) or the like may be used instead. The access point 104 is, for example, a device such as a wireless LAN router.

<Configurations of Smartphone and Printer>

Figure 2:
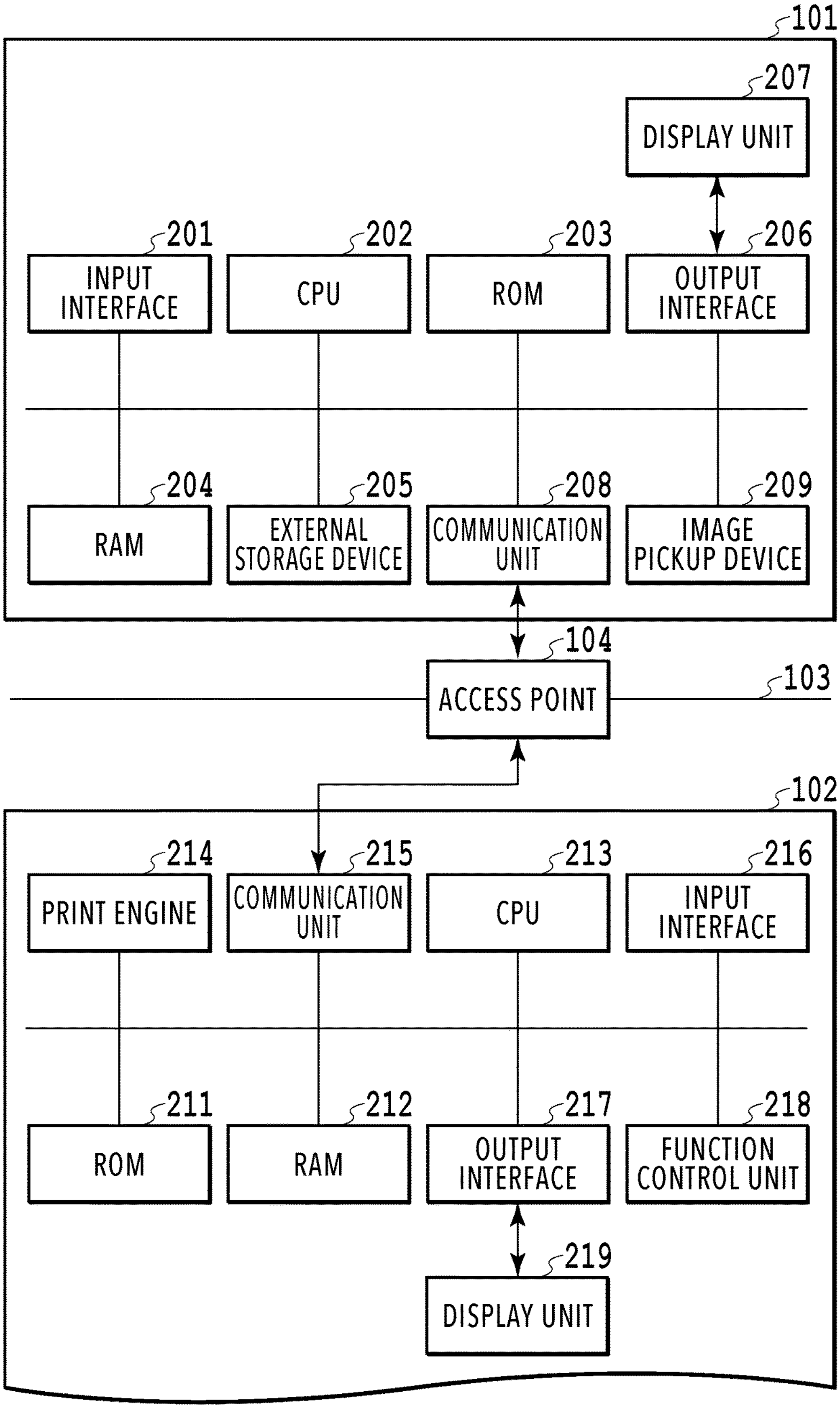
FIG. 2 is a block diagram illustrating hardware configurations of a smartphone and a printer.

Hereinafter, configurations of the smartphone 101 and the printer 102 illustrated in FIG. 1 will be described by using FIG. 2. FIG. 2 is a block diagram illustrating the hardware configurations of the smartphone 101 and the printer 102. The smartphone 101 includes an input interface 201, a CPU 202, a ROM 203, a RAM 204, an external storage device 205, an output interface 206, a display unit 207, a communication unit 208, an image pickup device 209, and so on.

The input interface 201 is an interface configured to receive data inputs and operation instructions from a user, and includes a physical keyboard, buttons, a touch panel, and so on. Note that, the output interface 206, which will be described later, and the input interface 201 may be structured in the same configuration such that the same configuration may perform screen outputs and receive operations from the user.

The CPU 202 is a system control unit, and controls the overall operations of the smartphone 101. The CPU 202 loads a program stored in the ROM 203 or the external storage device 205 onto the RAM 204 and executes the loaded program, thereby preforming various controls such as display of a UI screen (GUI), generation of print data, and transmission of print data. Here, GUI is an abbreviation of Graphical User Interface.

The ROM 203 stores fixed data such as control programs to be executed by the CPU 202, data tables, and an embedded operating system (hereinafter abbreviated as OS) program. In the present embodiment, using the control programs stored in the ROM 203, the CPU 202 performs software execution controls such as scheduling, task switching, and interrupt processing under the control of the embedded OS stored in the ROM 203.

The RAM 204 includes a static random access memory (SRAM) or the like needing a backup power supply. Since the RAM 204 holds data by using a primary battery for data backup (not illustrated), the RAM 204 is capable of storing important data such as program control variables without volatilizing them. In addition, the RAM 204 is also provided with a memory area for storing setting information of the smartphone 101, management data for the smartphone 101, and the like. Moreover, the RAM 204 is also used as a main memory and a work memory for the CPU 202.

The external storage device 205 stores application programs for applications to provide a print function, a scan function, and so on (a print application and a scan application to be described later). The external storage device 205 also stores various programs such as a print information generation program to generate print information that can be interpreted by the printer 102, and an information transmission/reception control program to transmit and receive information to and from the printer 102 coupled via the communication unit 208. The external storage device 205 also stores various types of information to be used by these programs and image data obtained from other terminal apparatuses and the Internet. In the present embodiment, a volatile memory such as a solid state drive (SSD) is assumed as the external storage device 205, but, instead, an auxiliary storage device such as a hard disk drive (HDD) may be employed. In this way, the hardware such as the CPU 202, the ROM 203, the RAM 204, and the external storage device 205 constitutes a so-called computer.

The output interface 206 is an interface to perform controls on the display unit 207 to perform display based on data and a notification of the state of the smartphone 101.

The display unit 207 includes a light emission diode (LED), a liquid crystal display (LCD), or the like. The display unit 207 performs display based on data and a notification of the state of the smartphone 101. Here, the display unit 207 may be provided with a software keyboard including keys such as numeric input keys, mode setting keys, an enter key, a cancel key, and a power key, so that inputs from the user may be received via the display unit 207. The display unit 207 also displays a screen provided by the OS and screens provided by the applications.

Here, one of screens provided by the applications and displayed by the OS is a picture-in-picture (PiP) screen in a PiP mode. The PiP screen is a screen for displaying a video and is displayed in a small size on a corner of the screen preferentially over the screen provided by the OS and the screens provided by the applications displayed on the display unit 207. The term "preferentially" means that the screen is displayed superimposed on the screen provided by the OS and the screens provided by the applications, and is displayed at the forefront among the screen layers (on the forefront side of the display unit). The phrase "displayed at the forefront" means the state where the PiP screen is the top screen displayed superimposed on the other screens different than the PiP screen. Such preferential display enables a user to perform operations on the screen provided by the OS and the screens provided by the applications while viewing the video. In the case where a video is displayed on a screen provided by an application, an object for switching to the PiP mode, so that the PiP screen is displayed. The display of the PiP screen can be changed with user's operations. For example, in the case where the input interface 201 receives, as a user's operation, a pinch-open operation in which the distance between two fingers is gradually widened, the PiP screen is enlarged. On the other hand, in the case where the input interface 201 receives a pinch-close operation in which the distance between two fingers is gradually narrowed, the PiP screen is made smaller. Moreover, in the case where the input interface 201 receives a tap operation on the PiP screen, a control for pausing, replaying, reversing, and forwarding the video, a control for closing the PiP screen, and a control for displaying the video in a full screen are displayed. In response to a user's operation on each of the controls, the display switches over according to the operation. Further, in the case where the input interface 201 receives an operation of dragging the PiP screen, the PiP screen is moved to another position. If the PiP screen is dragged to the end of the screen in this case, the PiP screen disappears but the video is continuously replayed even in this state.

The communication unit 208 is a constituent element coupled to external apparatuses such as the printer 102 and configured to perform data communications. For example, the communication unit 208 may directly communicate with the printer 102 via wireless communication, or communicate with the printer 102 via the access point 104 installed outside the smartphone 101 and the printer 102.

The image pickup device 209 is a device to convert an image captured by an image pickup element into digital data. This digital data is temporarily stored in the RAM 204. After that, according to a program executed by the CPU 202, this digital data is converted into image data in a predetermined image format, and the image data is stored in the external storage device 205.

The printer 102 is an apparatus with which the smartphone 101 communicates. The printer 102 includes a ROM 211, a RAM 212, a CPU 213, a print engine 214, a communication unit 215, an input interface 216, an output interface 217, a function control unit 218, a display unit 219, and so on.

The ROM 211 stores fixed data such as control programs to be executed by the CPU 213, data tables, and an embedded OS program. In the present embodiment, using the control programs stored in the ROM 211, the CPU 213 performs software execution controls such as scheduling, task switching, and interrupt processing under the control of the embedded OS stored in the ROM 211. In addition, the ROM 211 is also provided with a memory area for storing data to be held even under conditions with no power supply, such as setting information of the printer 102 and management data for the printer 102.

The RAM 212 includes a dynamic random access memory (DRAM) or the like needing a backup power supply. Since the RAM 212 holds data by being fed with a power supply for data backup (not illustrated), the RAM 212 is capable of storing important data such as program control variables without volatilizing them. Moreover, the RAM 212 is also used as a main memory and a work memory for the CPU 213. Further, the RAM 212 also functions as a reception buffer for temporarily storing print information received from the smartphone 101 or the like and stores various types of information.

The CPU 213 is a system control unit, and controls the overall operations of the printer 102. The CPU 213 loads a program stored in the ROM 211 onto the RAM 212, and executes the loaded program.

The print engine 214 forms an image on a print medium such as a paper sheet by using printing agents such as inks based on information stored in the RAM 212 and a print job received from the smartphone 101 or the like, and outputs the print result. In general, a print job transmitted from the smartphone 101 or the like is large in transmission data volume, and accordingly requires high-speed communication. For this reason, it is preferable to receive a print job via the communication unit 215 capable of relatively high-speed communication.

The communication unit 215 is a constituent element coupled to external apparatuses such as the smartphone 101 and configured to perform data communication. As a wireless communication method of the communication unit 215, Wi-Fi is used in the present embodiment, but Bluetooth Classic or the like may be used. The communication unit 215 includes, as an internal access point in the printer 102, an access point (not illustrated) for coupling with an apparatus such as the smartphone 101. This access point is capable of coupling with the communication unit 208 of the smartphone 101. The communication unit 215 may directly communicate with the smartphone 101 via the access point included in the communication unit 215, or communicate with the smartphone 101 via the access point 104. The communication unit 215 has a function of the access point. In this case, the communication unit 215 may have hardware to function as the access point, or operate as the access point by using software to function as the access point. Then, the printer 102 may include multiple internal access points that are different in service set identifier (SSID) and password.

The input interface 216 is an interface configured to receive data inputs and operation instructions from the user, and includes a physical keyboard, buttons, a touch panel, and so on. Note that, the output interface 217, which will be described later, and the input interface 216 may be structured in the same configuration such that the same configuration may perform screen outputs and receive operations from the user.

The output interface 217 is an interface configured to perform controls on the display unit 219 to perform display based on data and a notification of the state of the printer 102.

The function control unit 218 manages function operations such as determining whether to simultaneously operate functions included in the printer 102.

The display unit 219 includes a light emission diode (LED), a liquid crystal display (LCD), or the like. The display unit 219 performs display based on data, and a notification of the state of the printer 102. Here, the display unit 219 may be provided with a software keyboard including keys such as numeric input keys, mode setting keys, an enter key, a cancel key, and a power key, so that inputs from the user may be received via the display unit 219.

In general, a print system has been known which is configured to transmit print data to the printing apparatus by using a print application. In an information processing apparatus such as a smartphone in which the print application is installed, an OS as basic software is installed and the print application is invoked by the OS via a user's operation and operates. The user is enabled to instruct the printing apparatus to perform printing by using the print application. In making the instruction, the GUI of the print application is displayed on the screen of the smartphone. The state where an application is running while the GUI of the application is being displayed on the screen of the smartphone is referred to as a foreground state. In contrast, the state where an application is running while the GUI of the application is being hidden from the screen of the smartphone is referred to as a background state. For example, during execution of printing by the printing apparatus using the print application, the print application turns into the background state in the case where the GUI of the print application is closed to display the GUI of the OS or to switch the print application to another application.

In general, an operation in such a background state is often subject to an operational constraint. For example, in the background state, the application is allowed to continue processing only within a certain period of time determined by the OS, and the processing is canceled by the OS in some cases where the application fails to complete the processing within the certain period of time. The operational constraint in the background state is designed to prevent continuous execution of heavy processing that consumes a huge amount of resources of a smartphone such as a battery and a network while a user is unaware of the consumption.

However, if the user closes the GUI of the print application during execution of print processing, the operation state of the print application turns into the background state. In such a case, there arises a problem that if the print application fails to complete the print processing within a certain period of time determined by the OS, the OS performs task control to cancel the processing by the print application and delete the print job.

To address this, the present embodiment employs a sequence to be described later by using FIG. 6. Even in the case where the GUI of the print application is closed, this sequence makes it possible to perform control to enable the print application to continuously operate in the background state, so that the print application can continue the print processing. In addition, the print processing using such PiP mode allows an application other than the print application to be used even under the execution of the print processing, which improves user's convenience.

<Operations of Print Application>

Figure 3A:
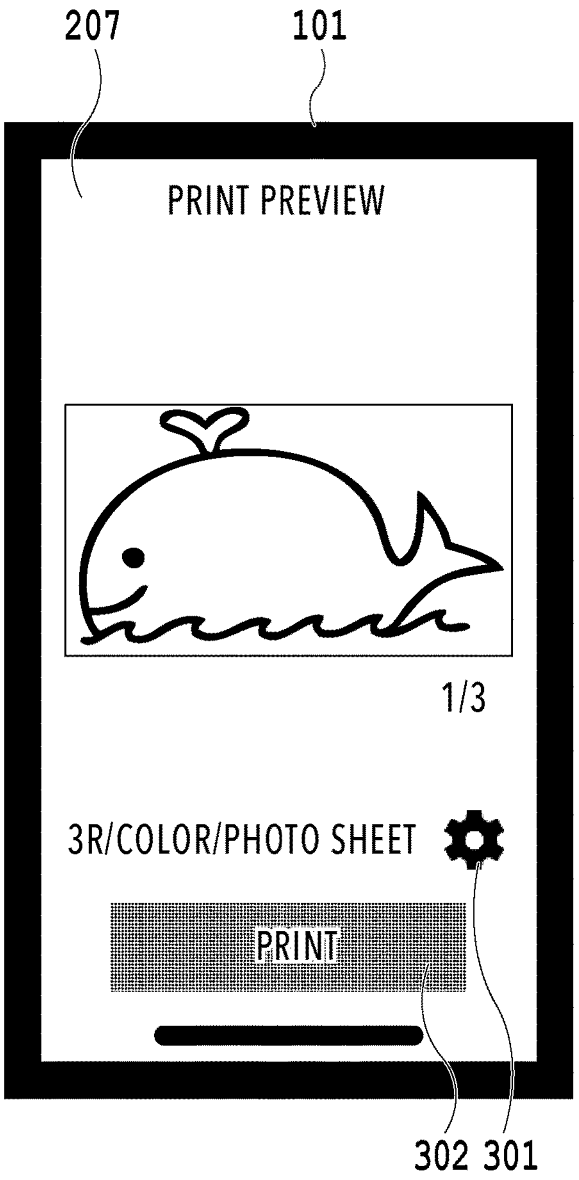
FIGS. 3A and 3B are diagrams illustrating GUIs provided by a print application.

Hereinafter, operations of the print application running on the smartphone 101 will be described by using FIGS. 3A, 3B, 4A, and 4B. FIG. 3A illustrates a state where a GUI of the print application is displayed on the display unit 207 of the smartphone 101 as a state where a user is using the print application stored in the external storage device 205 of the smartphone 101. In other words, FIG. 3A is the diagram illustrating the state where the screen provided by the print application during use is displayed on the smartphone 101. In FIG. 3A, the display unit 207 displays a screen for executing a print instruction to the printer 102 coupled to the smartphone 101 via the network or the like. This screen includes multiple objects such as an object 301 for making settings for printing and an object 302 for instructing a print start to execute printing. The user is enabled to use a function of the printer 102 by performing a tap operation (also referred to as pushing-down) on the object 301 or the object 302. Specifically, the object 301 is an object for making multiple print settings such as settings of the size, type, and margins of a sheet to be used in printing. The object 302 is an object for instructing print execution. In response to a tap operation on the object 302, print data such as image data or document data selected as a print target is transmitted to the printer 102 and the printer 102 executes the print processing based on the transmitted print data.

Figure 3B:
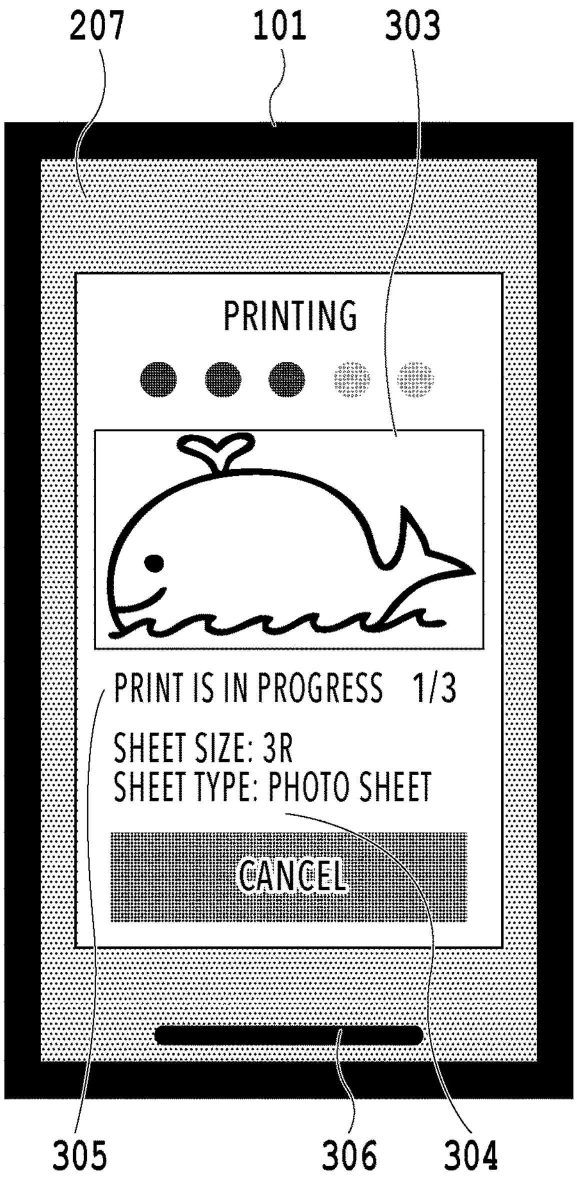

If a tap operation is performed on the object 302, the screen of the print application displayed on the display unit 207 of the smartphone 101 is switched to a screen illustrated in FIG. 3B. FIG. 3B illustrate a screen provided by the print application during execution of the print processing by the printer 102. On this screen, an image 303 representing the image data under printing, print setting information 304, status information 305 concerning a print operation by the printer 102, and so on are displayed. During the printing, communications between the smartphone 101 and the printer 102 are established with the communication unit 208 of the smartphone 101 and the communication unit 215 of the printer 102, and therefore the smartphone 101 can receive status information indicating a status of the printer 102. The screen of the print application illustrated in FIG. 3B is updated according to the status of the printer 102 indicated in the received status information. For example, if the printer 102 runs out of paper (or runs low on paper) or runs out of ink (or runs low on ink), the content in the status information 305 can be updated to present an error status of the printer 102 to the user.

The state where the print application is executing the processing while the screen of the running print application is displayed on the display unit 207 of the smartphone 101 as illustrated in FIGS. 3A and 3B is referred to as the foreground state. In the foreground state, since the processing to execute the print application is preferentially executed, the powers of the CPU 202 and the RAM 204 of the smartphone 101 can be used fully for the above processing. While the print application is in the foreground state, it is common practice that the screen of the print application covers a majority of the display unit 207 of the smartphone 101 and the user is disabled from performing any operation other than an operation for the print application.

Figure 4A:
FIGS. 4A and 4B are diagrams illustrating background states of the print application.

Here, the screen of the print application displayed on the display unit 207 of the smartphone 101 can be closed at any timing. For example, if a home button (not illustrated) equipped to the smartphone 101 is pushed down, the display of the display unit 207 of the smartphone 101 is switched to a screen provided by the OS installed in the smartphone 101. In addition, also with an operation of swiping upward a home bar 306 displayed at a lower portion of the display unit 207 of the smartphone 101, the display can be switched to the screen provided by the OS by closing the screen of the print application. FIG. 4A is a diagram illustrating a state after this switching. The state where the print application is running while the screen of the print application is hidden from the display unit 207 of the smartphone 101 is referred to as the background state. In the background state, the priority of the processing for executing the print application is lowered, and the powers of the CPU 202 and the RAM 204 of the smartphone 101 allocated for the processing are reduced. The print application operates on the OS, and the OS cancels the processing of the print application if the print application continues the processing in the background state for a predetermined period of time.

Figure 4B:
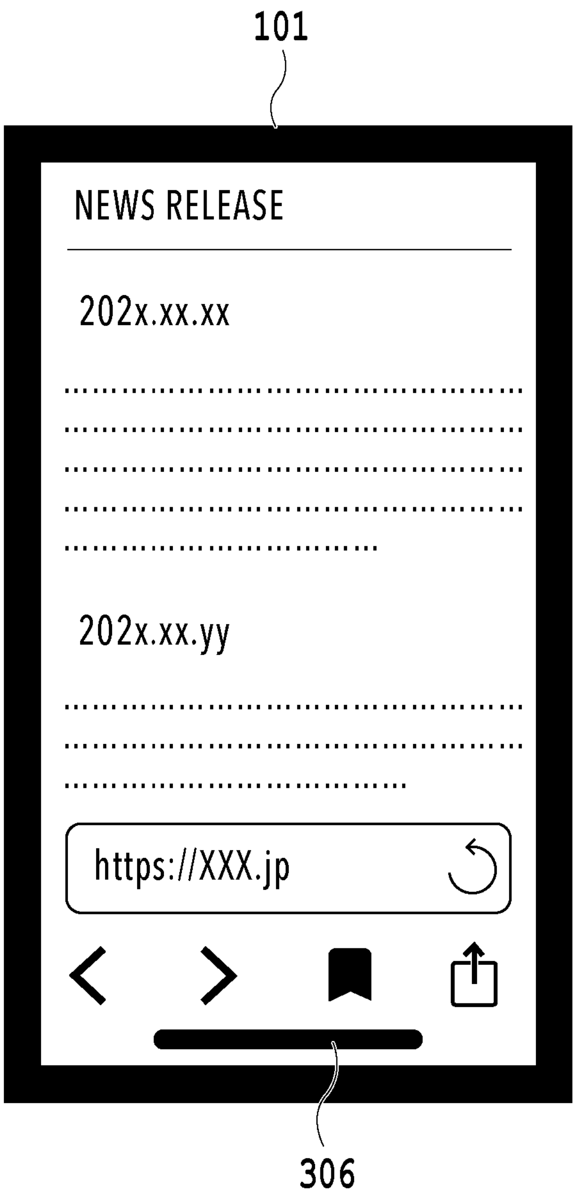

Then, there is another case where an application different from the print application is executed as illustrated in FIG. 4B. FIG. 4B illustrates a state where a Web browser is displayed as an example of a screen of an application different from the print application, and the print application in this state is also in the background state.

In the case where the operation state of the print application is the background state as illustrated in FIGS. 4A and 4B, the print application is allowed to continue the processing only within a certain period of time determined by the OS. For example, in the case where the print application during execution of the print processing illustrated in FIG. 3B turns to the state illustrated in FIG. 4A, the print application has to complete the print processing within the certain period of time determined by the OS. If the print application fails to complete the print processing within the certain period of time determined by the OS, the OS terminates the print application and deletes the print job.

Figure 5A:
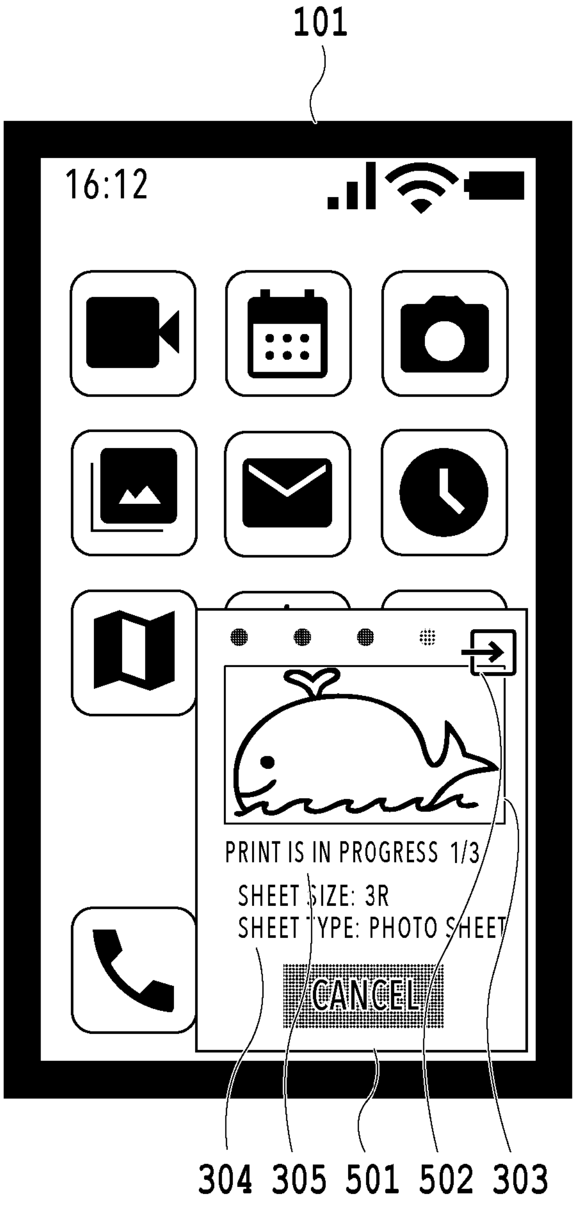
FIGS. 5A and 5B are diagrams illustrating GUIs in a picture-in-picture (PiP) mode.
Figure 5B:
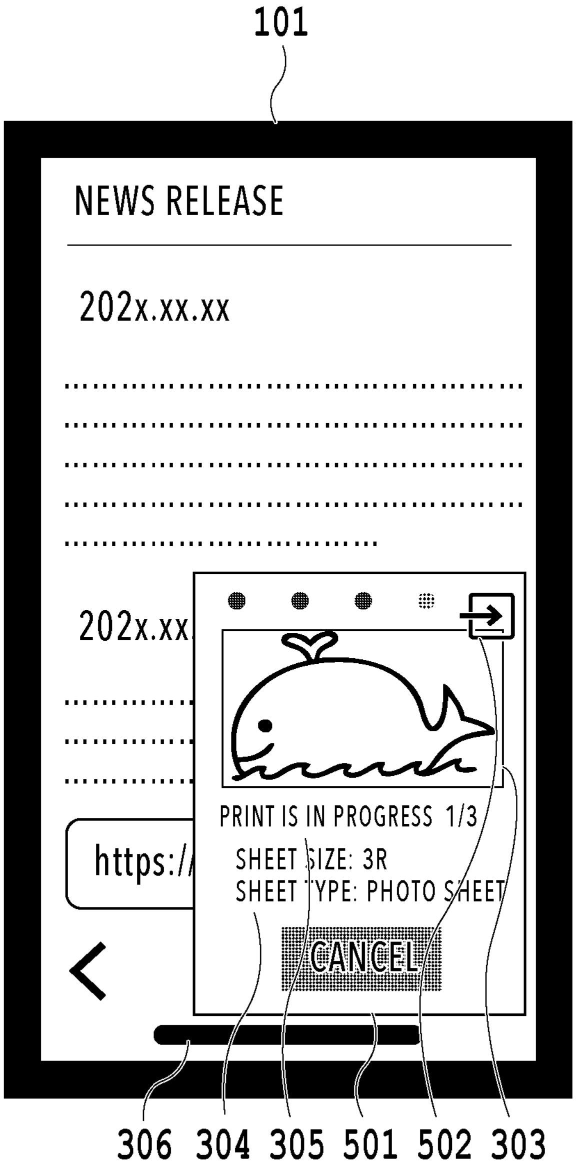

FIGS. 5A and 5B illustrate states where the screen of the print application is displayed in a picture-in-picture (PiP) mode on the display unit 207 of the smartphone 101. FIG. 5A illustrates a PiP mode in a state where the screen of the print application is closed and switched to the screen provided by the OS installed in the smartphone 101 as illustrated in FIG. 4A. FIG. 5B illustrates a PiP mode in a state where an application different from the print application is being executed as illustrated in FIG. 4B. A PiP screen 501 is configured by using elements of the screen of the print application, and the image 303 representing the image data under printing, the print setting information 304, the status information 305 concerning the print operation by the printer 102, and so on are displayed. In the PiP mode, the elements of the screen of the print application are displayed as a video. The video mentioned herein is a video obtained by capturing images of the screen of the print application at regular time intervals and connecting together the images captured at the regular time intervals. For example, per-second images of a partial area including a display area of the image 303 representing the image data under printing, a display area of the print setting information 304, and a display area of the status information 305 concerning the print operation by the printer 102 are obtained from the entire screen of the print application. Then, a video generated by connecting these images is displayed on the PiP screen 501. The aforementioned "partial area" is also referred to as a "sub-area".

In the case where the screen of the print application during execution of the print processing illustrated in FIG. 3B supports the PiP mode, the print application can be switched to the PiP mode if the same operation as the operation for turning the print application into the background state is performed during the execution of the print processing. Specifically, the screen of the print application is closed and switched to the PiP mode with an operation of pushing down the home button of the smartphone 101 or swiping upward the home bar 306 displayed at the lower portion of the display unit 207 of the smartphone 101. After the switching to the PiP mode, the print application operates in the background state. The screen in the PiP mode displayed after the switching is the screen in FIG. 5A.

Note that, unlike the background states illustrated in FIGS. 4A and 4B, the operational constraint imposed by the OS is relaxed in the background state in the PiP mode. For example, in the background state in the PiP mode, even if the print application fails to complete the print processing within the certain period of time determined by the OS, the print processing is not forcibly terminated by the OS. Therefore, even in the background state, the print application can continue the print processing by the printer 102 and continuously update the displayed contents on the PiP screen 501. In other words, the current status of the print operation by the printer 102 can be displayed on the PiP screen 501. For example, if the print application is switched to the PiP mode during the execution of the print processing illustrated in FIG. 3B and an error occurs in the printer 102, the displayed contents on the PiP screen 501 can be updated to inform the user of what error is occurring in the printer 102. As described above, a video generated by connecting images is displayed on the PiP screen 501. Therefore, even in the background state in the PiP mode, per-second images of an error information display area of the screen of the print application are obtained and a video generated by connecting the images thus obtained is displayed on the PiP screen 501.

Then, the PiP screen 501 includes an object 502 for terminating the PiP mode and returning the print application to the foreground state. If the user performs a tap operation on the object 502, the PiP mode is terminated and the print application turns into the foreground state. In this example, the object 502 is provided such that the PiP screen 501 includes the object 502, but the entire PiP screen 501 may function as the object 502. In this case, if a tap operation is performed on any place of the PiP screen 501, the PiP mode is terminated and the print application turns into the foreground state.

Moreover, the PiP screen 501 can be moved freely with swiping of the PiP screen 501 in a desired movement direction. In this case, the PiP screen 501 can be also moved to a place where the PiP screen 501 disappears from the display unit 207 of the smartphone 101. In this case, only an object for re-displaying the PiP screen 501 on the display unit 207 of the smartphone 101 remains.

In the case of switching to the PiP mode during execution of the print processing, constituent elements of the screen of the print application can be left displayed at the forefront of the display unit 207 of the smartphone 101. Such constituent elements include, for example, the display area of the image 303 representing the image data under printing, the display area of the print setting information 304, and the display area of the status information 305 concerning the print operation by the printer 102. In the PiP mode, the smartphone 101 is enabled to receive any operation including an operation unrelated to an action by the print application. In other words, the smartphone 101 in the PiP mode is enabled to execute any application, other than the print application, stored in the external storage device 205. For example, FIG. 5B illustrates the state where the Web browser is being executed as an application other than the print application in the PiP mode.

With the use of the PiP mode as described above, the print application is enabled to continuously operate in the background state and continue the print processing even if the GUI of the print application is closed. In addition, with the use of the PiP mode, even during execution of print processing, an application other than the print application can be used, which improves the user's convenience.

The typical operation configuration concerning the PiP mode is described in the present embodiment, but the present disclosure is not limited to this as long as the object of the present disclosure can be achieved. For example, described is the case where the operation of switching the print application to the background state is used as the operation of switching the print application from the foreground state to the PiP mode, but the operation is not limited to this. For example, a configuration may be such that the screen under the execution of the print processing illustrated in FIG. 3B includes an object for switching to the PiP mode and the print application is switched to the PiP mode with an operation on the object. Instead, in response to an operation on the object 302 for instructing a print start illustrated in FIG. 3A, the printer 102 may start the print processing and the print application may be switched to the PiP mode.

In addition, the information displayed on the PiP screen 501 may be limited to only the status information 305 concerning the print processing by the printer 102. As the amount of information displayed on the PiP screen 501 becomes smaller, the size of the PiP screen 501 can be reduced and the area for displaying the screen of another desired application during the execution of the print processing can be increased.

Moreover, the video generated by connecting the per-second images of the elements of the screen of the print application is displayed on the PiP screen 501, but the displayed contents are not limited to this. For example, an object for canceling the print processing of the print application may be provided and the print application may instruct the printer 102 to cancel the print processing in response to an operation on the object. In addition, an object for displaying an online manual of the printer 102 may be provided and the online manual may be displayed on the Web browser or the like in response to a user's operation on the object. Also in this case, the PiP mode is continued, so that the print processing by the print application can be continued without cancellation.

Moreover, in the case where the print application detects the completion of the print processing by the printer 102, the print application may terminate the PiP mode and turn into the foreground state. Instead, in the case where the print application detects the completion of the print processing by the printer 102, the print application may terminate the PiP mode and turn into the usual background state. This is because, if the print processing by the printer 102 is completed, the print application does not have to continue any processing, and no printing is canceled even after the print application is switched to the background state.

Thus, using the PiP mode, the print application is enabled to continuously operate in the background state in the case where the GUI of the print application is closed during execution of the print processing. Therefore, the print processing can be continued and completed. In addition, in various embodiments using the PiP mode as described above, an application other than the print application can be used even during execution of print processing, which improves the user's convenience.

<Processing in PiP Mode>

Hereinafter, processing of the smartphone 101 in the PiP mode will be described by using FIG. 6. FIG. 6 is a flowchart presenting processing executed in the case of using the PiP mode according to the print application and the OS.

In step S601, the CPU 202 of the smartphone 101 receives an input of a user's operation such as tapping on the object 302 (see FIG. 3A) on the GUI of the print application displayed on the display unit 207. Here, the object 302 is the object for instructing the printer 102 to start printing and execute print processing as described above. For simplification, "step S#" will be abbreviated as "S#" below.

In S602, the CPU 202 instructs the printer 102 to execute print processing by using the print application. The printer 102 after receiving the instruction to execute the print processing in this step executes the print processing.

In S603, using the print application, the CPU 202 displays, on the display unit 207, a screen indicating that the print processing is in progress (see FIG. 3B).

In S604, using the print application, the CPU 202 determines whether the smartphone 101 supports the PiP mode and is allowed to use the PiP mode. The reason for execution of the determination processing in this step is to prevent execution of processing for the PiP mode in the case of a smartphone 101 that does not support the PiP mode and cannot use the PiP mode. Moreover, the execution of the processing for the PiP mode is also prevented in the case of a smartphone 101 that supports the PiP mode but is not allowed to use the PiP mode, and therefore cannot use the PiP mode. If the determination result in this step is true (YES), the processing advances to S605. If the determination result is false (NO), the processing in S610 and S611 is executed and then the processing of this flowchart ends (not illustrated).

In S605, using the print application, the CPU 202 obtains an image (data) of a display area of information concerning the execution of the print processing every second as a partial area of the entire GUI screen indicating that the print processing is in progress. This partial area is an area including at least one of the display area of the image 303 representing the image data under printing, the display area of the print setting information 304, and the display area of the status information 305 concerning the print operation by the printer 102 (see FIG. 3B).

In S606, using the print application, the CPU 202 generates a video at a rate of one frame per second by using the per-second images obtained in S605. Here, the execution of S605 and S606 is iterated every second during the execution of the print processing by the printer 102. In other words, the execution of S605 and S606 is iterated until the completion of the print processing is detected. Through S605 and S606, the video to be displayed on the PiP screen 501 can be generated.

Here, the CPU 202 is assumed to detect the switching of the print application to the background state after S606. Then, in response to the switching of the print application to the background state, the CPU 202 determines, using the print application in S607, whether the PiP mode is available to the print application. For example, if another application different from the print application is running in the PiP mode, the PiP mode is unavailable to the print application. If the determination result in this step is true, the processing advances to S608. On the other hand, if the determination result in this step is false, the processing in S610 and S611 is executed and then the processing of this flowchart ends. In this case, the print application does not operate in the PiP mode but turns into the usual background state.

In S608, using the print application, the CPU 202 starts an operation in the PiP mode.

In S609, using the OS, the CPU 202 displays the PiP screen 501 on the display unit 207 of the smartphone 101. In the PiP mode, the CPU 202 continuously performs the aforementioned iterative processing in S605 and S606 by using the print application and the video generated in S606 is displayed on the PiP screen 501. Thus, with the start of the operation in the PiP mode, the print processing under execution by the print application can be continued without being terminated by the OS.

In S610, using the print application, the CPU 202 obtains status information concerning the print processing under execution by the printer 102. This status information is transmitted from the printer 102. The obtaining processing in this step is executed at intervals of four seconds during the execution of the print processing by the printer 102. In the present embodiment, the time interval employed in S605 (referred to as a first time interval) is one second and the time interval employed in S610 (referred to as a second time interval) is four seconds, but the time intervals are not limited to them. However, it is preferable that the second time interval be equal to or longer than the first time interval.

Here, the print status indicated in the status information obtained in S610 is assumed to change. A possible example of the change is that the printing is nearly completed, or that the remaining amount of a printing agent such as an ink becomes small. In such a case, in S611, using the print application, the CPU 202 updates the displayed contents on the GUI of the print application. In the present embodiment, the displayed contents that may be possibly updated in this step are contents based on, specifically, the image 303 representing the image data under printing, the print setting information 304, the status information 305 concerning the print operation by the printer 102, and so on. In other words, every time updated information is obtained, the contents based on the obtained information are displayed on the display unit 207 of the smartphone 101. In addition, the update processing in S611 is executed irrespective of whether the print application is running in the foreground state or the background state in the PiP mode.

Here, the CPU 202 is assumed to detect the termination of the PiP mode by using the OS. In this case, in S612, the CPU 202 returns the print application to the foreground state by using the OS. Regarding the termination of the PiP mode, the CPU 202 may determine the termination of the PiP mode by detecting an operation on a certain object on the PiP screen 501 or may be informed of the termination of the PiP mode via the print application that detects the completion of the print processing by the printer 102.

Here, the CPU 202 is assumed to detect the completion of the print processing by the printer 102. In response to this detection, in S613, using the print application, the CPU 202 terminates the processing for the PiP screen display and the processing for the printing. The processing for the PiP screen display specifically includes the image data obtaining in S605 and the video generation in S606 described above. The processing for the printing specifically includes the status information obtaining in S610 and the displayed contents update in S611.

<Effects and so on of Present Embodiment>

The print processing using the PiP mode follows the aforementioned sequence. In the foregoing embodiment, described is the configuration to generate the video in S606 by using the images obtained in S605, and display the generated video on the PiP screen in S609. However, the contents generated by using the obtained images and displayed are not limited to the video. For example, it is also possible to employ a configuration to obtain an image of an entire or partial area of the GUI screen (under the execution of the application) at predetermined intervals (for example, 10 seconds), and display the obtained image directly on the PiP screen (as still-image contents displayed with switchover at the predetermined intervals). In addition, the contents may be other than an image. For example, the GUI screen of the print application without any change may be displayed as the PiP screen and the "cancel" button displayed on the screen during printing may be enabled to be operated on the PiP screen.

Figure 6:
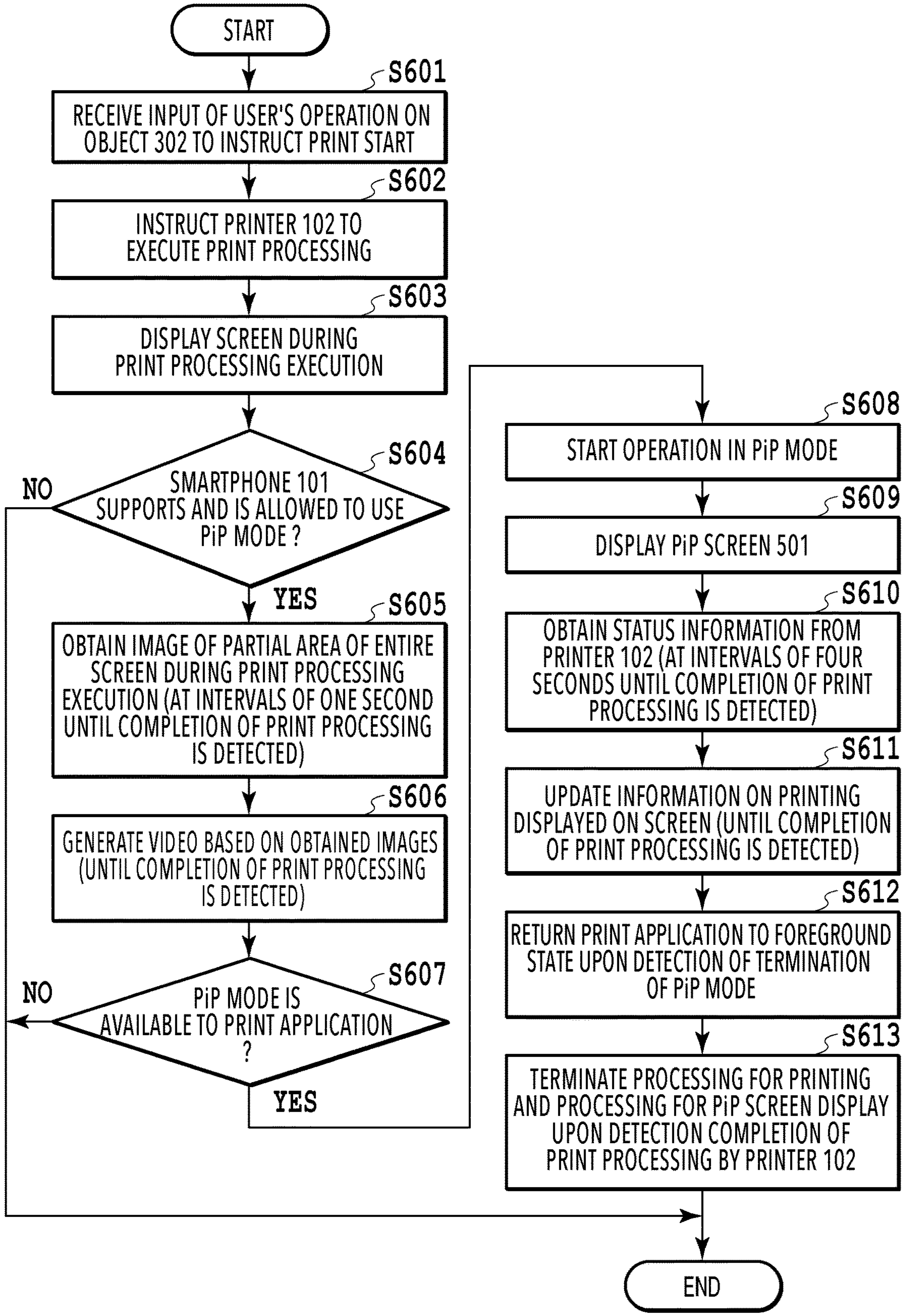
FIG. 6 is a diagram illustrating processing in the PiP mode by the print application and an OS.

With the use of the above sequence described by using FIG. 6, the print application is enabled to continuously operate in the background state and continue the print processing even if the GUI of the print application is closed. In addition, the print processing using such PiP mode makes it possible to use an application other than the print application even under the execution of the print processing, which improves user's convenience.

Second Embodiment

Figure 7:
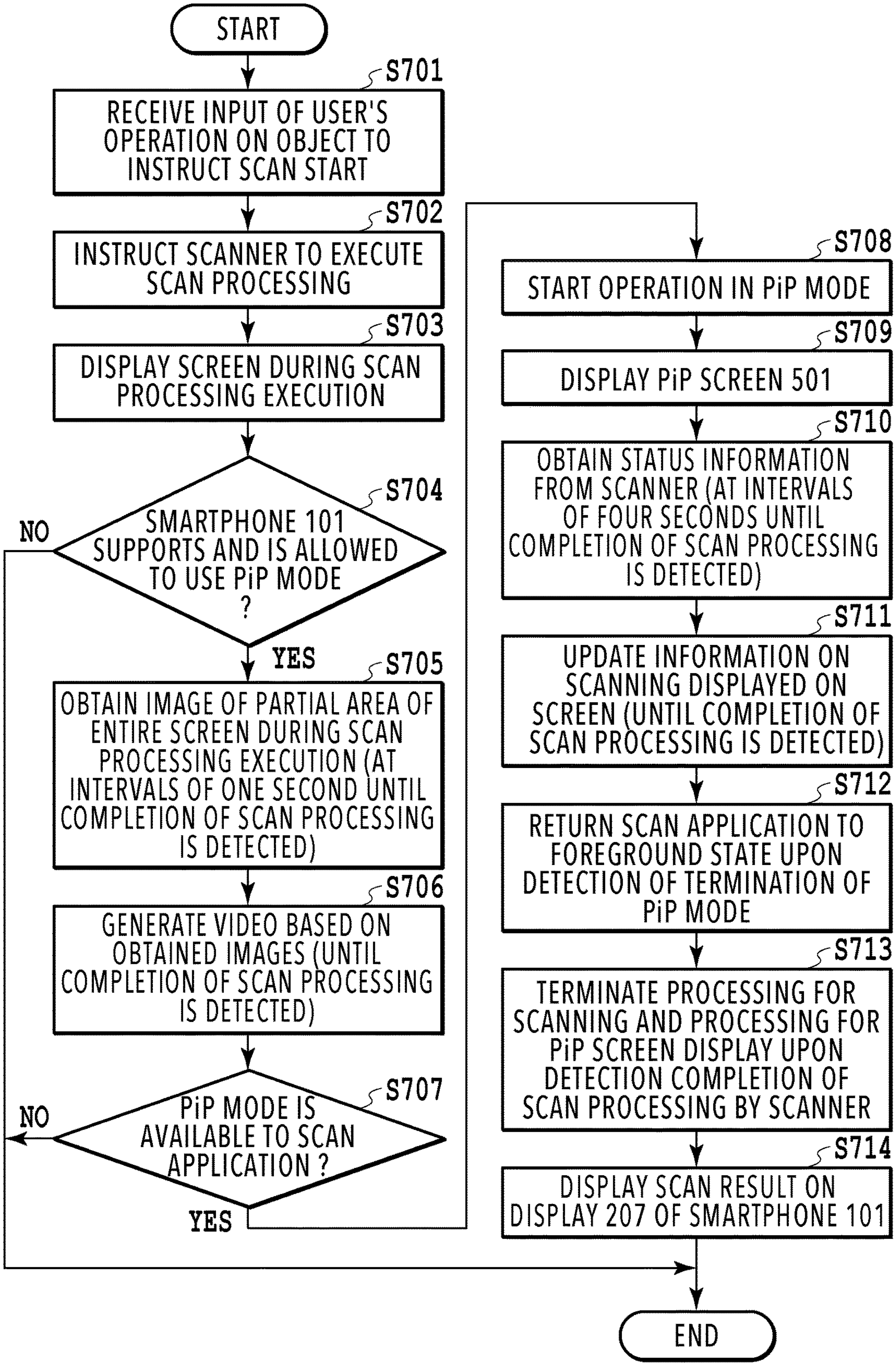
FIG. 7 is a diagram illustrating processing in the PiP mode by a scan application and the OS.

In a present embodiment, the technical idea according to the present disclosure is applied to a scan function. Hereinafter, an operation in the case where the technical idea is applied to the scan function will be described by using FIG. 7. FIG. 7 is a flowchart presenting processing executed in the case of using the PiP mode according to a scan application and the OS. Hereinafter, the same matters as in the first embodiment may be omitted when unnecessary from the description (see FIG. 6) and matters different from those in the first embodiment will be mainly described.

In S701, the CPU 202 of the smartphone 101 receives an input of a user's operation such as tapping on an object on the GUI of the scan application displayed on the display unit 207. This object is an object for instructing a scanner to start scanning and execute scan processing.

In S702, using the scan application, the CPU 202 instructs the scanner to execute the scan processing. The scanner after receiving the instruction to execute the scan processing in this step executes the scan processing.

In S703, using the scan application, the CPU 202 displays, on the display unit 207, a screen indicating that the scan processing is in progress.

In S704, using the scan application, the CPU 202 determines whether the smartphone 101 supports the PiP mode and is allowed to use the PiP mode. If the determination result in this step is true, the processing advances to S705. On the other hand, if the determination result in this step is false, the processing in S710, S711, and S714 is executed and then the processing of this flowchart ends (not illustrated).

In S705, using the scan application, the CPU 202 obtains an image (data) of a display area of information concerning the execution of the scan processing every second as a partial area of the entire GUI screen indicating that the scan processing is in progress. This partial area is an area at least including a display area of scan setting information and a display area of status information concerning the scan operation by the scanner.

In S706, using the scan application, the CPU 202 generates a video at a rate of one frame per second by using the per-second images obtained in S705. Here, the execution of S705 and S706 is iterated every second during the execution of the scan processing by the scanner. In other words, the execution of S705 and S706 is iterated until the completion of the scan processing is detected. Through S705 and S706, the video to be displayed on the PiP screen 501 can be generated.

Here, the CPU 202 is assumed to detect the switching of the scan application to the background state after S706. Then, in response to the switching of the scan application to the background state, the CPU 202 determines whether the PiP mode is available to the scan application using the scan application in S707. If the determination result in this step is true, the processing advances to S708. On the other hand, if the determination result in this step is false, the processing in S710, S711, and S714 is executed and then the processing of this flowchart ends (not illustrated).

In S708, the CPU 202 starts an operation in the PiP mode using the scan application.

In S709, the CPU 202 displays the PiP screen 501 on the display unit 207 of the smartphone 101 by using the OS. In the PiP mode, the CPU 202 continuously performs the aforementioned iterative processing in S705 and S706 by using the scan application and the video generated in S706 is displayed on the PiP screen 501. Thus, with the start of the operation in the PiP mode, the scan processing under execution by the scan application can be continued without being terminated by the OS.

In S710, using the scan application, the CPU 202 obtains status information concerning the scan processing under execution by the scanner. This status information is transmitted from the scanner. The obtaining processing in this step is executed at intervals of four seconds during the execution of the scan processing by the scanner.

Here, the scan status indicated in the status information obtained in S710 is assumed to change. In such a case, in S711, using the scan application, the CPU 202 updates the displayed contents on the GUI of the scan application. In the present embodiment, the displayed contents that may be possibly updated in this step are contents based on, specifically, the scan setting information, the status information concerning the scan operation by the scanner, and so on.

Here, the CPU 202 is assumed to detect the termination of the PiP mode by using the OS. In this case, in S712, the CPU 202 returns the scan application to the foreground state by using the OS. Regarding the termination of the PiP mode, the CPU 202 may determine the termination of the PiP mode by detecting an operation on a certain object on the PiP screen 501 or may be informed of the termination of the PiP mode via the scan application that detects the completion of the scan processing by the scanner.

Here, the CPU 202 is assumed to detect the completion of the scan processing by the scanner. In response to this detection, in S713, using the scan application, the CPU 202 terminates the processing for the PiP screen display and the processing for the scanning. The processing for the PiP screen display specifically includes the image data obtaining in S705 and the video generation in S706 described above. The processing for the scanning specifically includes the status information obtaining in S710 and the displayed contents update in S711.

In S714, using the scan application, the CPU 202 displays a scanning result on the display unit 207 of the smartphone 101. Although this scanning result is herein displayed on the GUI of the scan application in the foreground state, the scanning result may be displayed on the PiP screen if a display area of the scanning result is set as a display target area for the PiP screen 501. For scanning multiple pages, an object for scanning the next page may be displayed on the PiP screen 501 and the CPU 202 may instruct the scanner to execute the scan processing for the next page in response to an operation on the object.

The scan processing using the PiP mode follows the aforementioned sequence. With the use of the sequence described above, the scan application is enabled to continuously operate in the background state and continue the scan processing even if the GUI of the scan application is closed. In addition, the scan processing using such PiP mode makes it possible to use an application other than the scan application even under the execution of the scan processing, which improves user's convenience.

Other Embodiments

The foregoing embodiments can be achieved by executing the following processing. Specifically, this is the processing in which software (program) for implementing the functions in each of the foregoing embodiments is provided to a system or apparatus via a network or any of various types of storage media, and a computer in the system or apparatus (such as a CPU or MPU) reads and executes the program. The program may be executed by a single computer or be executed collaboratively by multiple computers. Moreover, all the processing described above does not have to be implemented only by software, but a part or the whole of the processing may be implemented by hardware such an ASIC. In addition, instead of using a single CPU to perform all the processing, multiple CPUs may perform the processing collaboratively as needed.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to use an application different from a certain application even while a function of the certain application is being executed, which improves user's convenience.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-022680, filed Feb. 16, 2023, which is hereby incorporated by reference wherein in its entirety.

What is claimed is:

1. A non-transitory computer readable storage medium storing an application program causing an information processing apparatus to execute a method comprising:

a first obtaining step of obtaining an image concerning a task being executed by the application program; and a generating step of generating a content based on the image obtained in the first obtaining step, wherein in a case where the application program is switched to a background state during the execution of the task, the content is displayed on a forefront side on a display unit of the information processing apparatus, wherein the image is obtained at first time intervals in the first obtaining step, the first time interval being one second, and wherein the content is a video at a rate of one frame per second.

2. The medium according to claim 1 further comprising a continuing step of allowing the application program to continuously execute the task until the task is completed, even in the case where the application program is switched to the background state.

3. The medium according to claim 2, wherein the information processing apparatus operates in a picture-in-picture mode, and the content is displayed on a picture-in-picture screen.

4. The medium according to claim 3, wherein in response to detection of termination of the picture-in-picture mode, the application program in the background state is returned to a foreground state.

5. The medium according to claim 1, wherein the image is an image of a display area for displaying information on execution of the task as a sub-area of an entire screen of a graphical user interface (GUI) indicating that the application program is executing the task.

6. The medium according to claim 5 further comprising a second obtaining step of obtaining the information on the execution of the task.

7. The medium according to claim 6, wherein the task is executed by an external apparatus outside the information processing apparatus, and in the second obtaining step, the information on the execution of the task transmitted from the external apparatus is obtained at second time intervals equal to or longer than the first time intervals.

8. The medium according to claim 7, wherein a content of the video is updated based on the information on the execution of the task obtained in the second obtaining step.

9. The medium according to claim 1, wherein the image concerning the task being executed by the application program is an image concerning a GUI, and the content is displayed on the forefront side of the display unit in response to a user's operation on an object included in the GUI.

10. The medium according to claim 9, wherein the object is an object to instruct execution of the task.

11. The medium according to claim 1, wherein display of the content is terminated in a case where the task is completed.

12. The medium according to claim 5, wherein the task is print processing by a printer, the application program is a print application program, and the sub-area includes at least one of a display area of an image representing image data under printing, a display area of print setting information, and a display area of status information concerning a print operation by the printer.

13. The medium according to claim 5, wherein the task is scan processing by a scanner, the application program is a scan application program, and the sub-area includes at least one of a display area of scan setting information and a display area of status information concerning a scan operation by the scanner.

14. The medium according to claim 1, wherein the application program operates on an operating system (OS) and the OS cancels processing of the application program in a case where the application program operates in the background state for a predetermined period of time.

15. An information processing method comprising:

an obtaining step of obtaining an image concerning a task being executed by an application program;

a generating step of generating a content based on the image obtained in the obtaining step; and a displaying step of displaying the content on a forefront side of a display unit of an information processing apparatus in a case where the application program is switched to a background state during the execution of the task, wherein the image is obtained at first time intervals in the obtaining step, the first time interval being one second, and wherein the content is a video at a rate of one frame per second.

16. An information processing apparatus comprising:

one or more processors; and one or more memories storing instructions that, when executed by the one or more processors, cause the information processing apparatus to store an application program;

obtain an image concerning a task being executed by the application program;

generate a content based on the image obtained by the obtaining section; and display the content on a forefront side of a display unit of the information processing apparatus in a case where the application program is switched to a background state during the execution of the task, wherein the image is obtained at first time intervals, the first time interval being one second, and wherein the content is a video at a rate of one frame per second.

* * * * *